(12) United States Patent
Young et al.

(10) Patent No.: US 7,742,439 B2
(45) Date of Patent: Jun. 22, 2010

(54) AUTOMATED CORRECTION OF DUPLEX MISMATCHES

(75) Inventors: Kevin Young, Roseville, CA (US); Giuseppe Scaglione, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 313 days.

(21) Appl. No.: 11/580,458

(22) Filed: Oct. 13, 2006

(65) Prior Publication Data

US 2008/0089249 A1    Apr. 17, 2008

(51) Int. Cl.
*H04L 5/16* (2006.01)
(52) U.S. Cl. .................. 370/296; 370/282; 370/276; 370/242
(58) Field of Classification Search ................ 370/296, 370/282, 276, 242
See application file for complete search history.

(56) References Cited

U.S. PATENT DOCUMENTS

| | | |
|---|---|---|
| 6,175,865 B1 | 1/2001 | Dove et al. |
| 6,460,078 B1 | 10/2002 | Dove et al. |
| 6,580,697 B1 * | 6/2003 | Gardner et al. .............. 370/296 |
| 6,665,275 B1 * | 12/2003 | Davy et al. .................. 370/282 |
| 6,992,989 B2 * | 1/2006 | Chen et al. .................. 370/282 |
| 2007/0183349 A1 * | 8/2007 | Pannell et al. .............. 370/276 |
| 2007/0230550 A1 * | 10/2007 | Curran-Gray et al. ....... 375/224 |

OTHER PUBLICATIONS

"Port Configuration" Webpages [online] [retrieved on Oct. 13, 2006]. Retrieved from the internet: http://www.cisco.com/univercd/cc/td/doc/product/lan/c2900xl/29_35xp/olhelp/porthelp.htm.

* cited by examiner

*Primary Examiner*—Huy D Vu
*Assistant Examiner*—Omer Mian

(57) ABSTRACT

One embodiment relates to a method for automated correction of duplex mismatches. A duplex mismatch is detected at a port of a network device, and characteristics of the duplex mismatch are determined. The configuration of the mismatched port is automatically modified based upon said characteristics. Another embodiment relates to an apparatus for automated correction of duplex mismatches. The apparatus includes a duplex mismatch detector and an automated duplex mismatch fixer. The duplex mismatch detector is configured to detect a duplex mismatch at a port of a network device and to determine characteristics of the duplex mismatch. The automated duplex mismatch fixer is configured to modify a configuration of the mismatched port based upon said characteristics. Other embodiments and features are also disclosed.

15 Claims, 3 Drawing Sheets

AUTOMATED CORRECTION OF DUPLEX MISMATCHES

CROSS-REFERENCE TO RELATED APPLICATIONS

The present application is related to U.S. patent application Ser. No. 10/866,346, entitled "Finding Duplex Mismatches in Copper Based Networks," filed Jun. 10, 2004 by inventors Giuseppe Scaglione and Kevin Young.

TECHNICAL FIELD

Embodiments of the invention relate generally to networking and communications.

BACKGROUND

Many local area network (LAN) products today use a medium formed by copper wire pairs for the transmission and reception of data. A network that used the copper wire pairs is defined as a copper based network. Existing technology based on the copper wire pairs include, for example, 10BASE-T, 100BASE-TX, and 1000BASE-T. All of these technologies have the ability to negotiate speed, duplex mode (half duplex or full duplex), flow-control, and other important aspects of a link operation by using low frequency pulses to communicate the desired state of operation for the link prior to actually engaging in the specific link signaling. This negotiation process is called "auto-negotiation".

During link negotiation between two nodes in a link in a network, for example, a port of a first node may be set in the auto-negotiation mode, while a port of the second node is not set in the auto-negotiation mode. As a result, the first node may be made to negotiate at half-duplex, while the second node may be set to full-duplex. For example, the first node (which is in auto-negotiation mode) may be set to negotiate at 100 half-duplex or full-duplex, while the second node (which is not in auto-negotiation mode) may be set (by a forced setting) to 100 full-duplex. This creates a duplex operation mismatch (duplex mismatch) as the port in auto-negotiation mode will link in half duplex as per the standard.

As known to those skilled in the art, full-duplex data transmission means that data can be transmitted in both directions on a signal carrier at the same time. For example, on a local area network with a technology that has full-duplex transmission, one workstation can be sending data on the line while another workstation is receiving data. As also known to those skilled in the art, half-duplex data transmission means that data can be transmitted in both directions on a signal carrier, but not at the same time. For example, on a local area network using a technology that has half-duplex transmission, one workstation can send data on the line and then receive data on the line once its data has been received by the link partner.

The above-mentioned duplex operation mismatch (where one node is set to half-duplex and the other node is set to full-duplex) can lead to degraded performance between the two nodes. The degraded performance may manifest as a slower network connection with frequent errors and collisions.

The degraded performance often results in trouble calls by the customer to the network support center of a node vendor. In a 10BASE-T/100BASE-T network, duplex mismatch problems are typically the most fielded calls by support engineers from customers and is thus the most costly product issue.

Conventional technology does not provide the ability for the customer to know, detect and correct a duplex mismatch condition. Hence, conventional technology does not reduce the countless support calls to the support engineers from customers and does not lead to reductions in costs for the node vendor.

A conventional port configuration method from Cisco Corporation merely provides settable flags that indicate network error. However, this previous port configuration method does not provide specific guidance to the customer on identifying the network problem and simply shuts down the port and informs the customer that an error has occurred.

Therefore, the conventional technology is limited in its capabilities and suffers from at least the above constraints and deficiencies.

SUMMARY

One embodiment relates to a method for automated correction of duplex mismatches. A duplex mismatch is detected at a port of a network device, and characteristics of the duplex mismatch are determined. The configuration of the mismatched port is automatically modified based upon said characteristics.

Another embodiment relates to an apparatus for automated correction of duplex mismatches. The apparatus includes a duplex mismatch detector and an automated duplex mismatch fixer. The duplex mismatch detector is configured to detect a duplex mismatch at a port of a network device and to determine characteristics of the duplex mismatch. The automated duplex mismatch fixer is configured to modify a configuration of the mismatched port based upon said characteristics.

Other embodiments and features are also disclosed.

DETAILED DESCRIPTION

Figure 1:
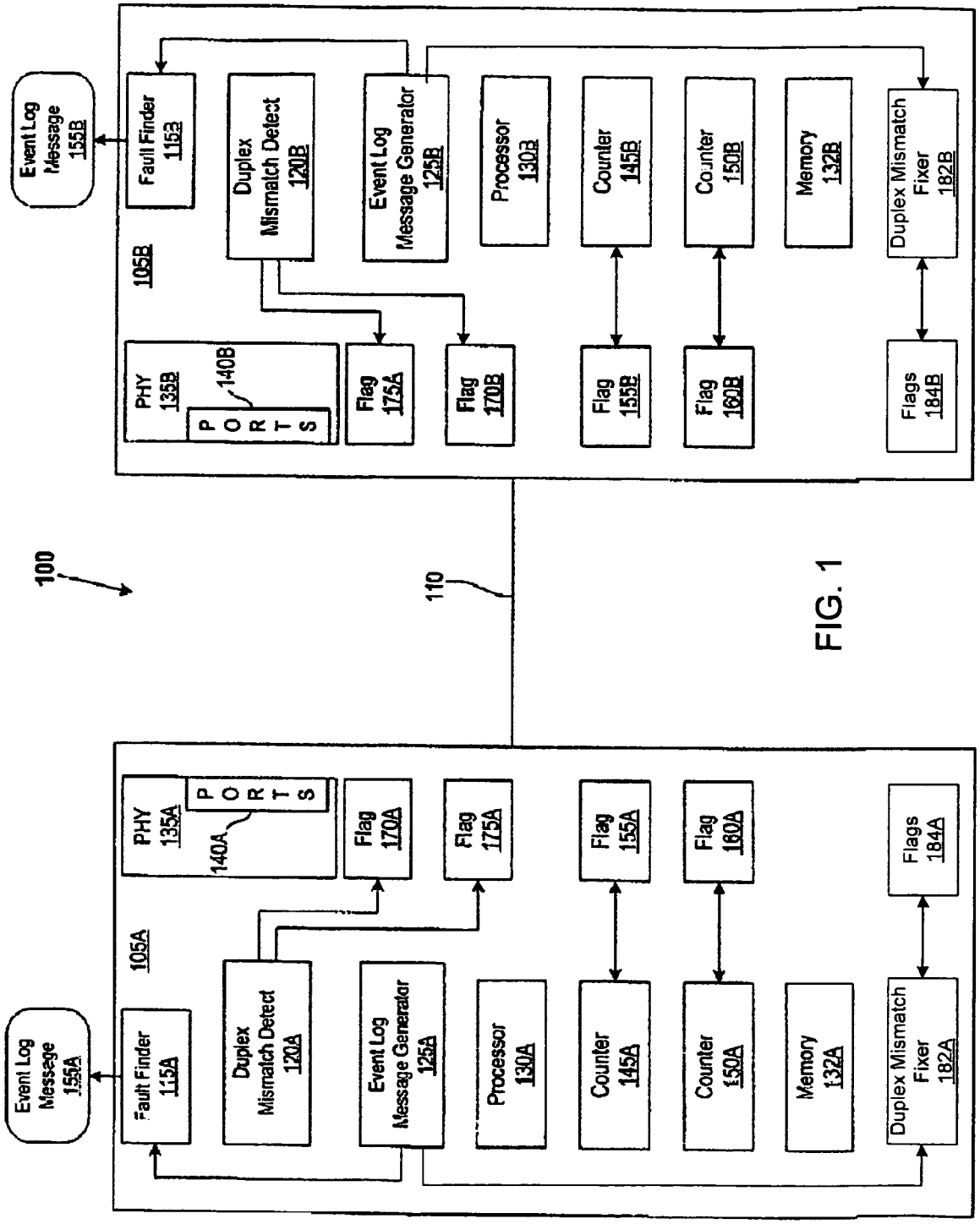
FIG. 1 is a block diagram of an apparatus for automated detection and correction of a duplex mismatch in accordance with an embodiment of the invention.

FIG. 1 is a block diagram of an apparatus for automated detection of a duplex mismatch in accordance with an embodiment of the invention. The apparatus 100 includes two nodes 105A and 105B (generally, node 105) that are connected by a link 110. The nodes 105A and 105B are network devices such as, for example, network switches. The nodes 105A and 105B include fault finders 115A and 115B, duplex mismatch detect module 120A and 120B, event log message generator modules 125A and 125B, processors 130A and 130B, and PHYs (physical link layers) 135A and 135B (generally, PHY 135), respectively, as shown in FIG. 1. The PHYs 135A and 135B include ports 140A and 140B, respectively, and include other suitable standard hardware components in network devices and permit the transmission of data over the link 110. For example, a PHY 135 typically includes an MDI (medium dependent interface) which is the connection to the link (medium) 110 (i.e., the direct physical and electrical connection to the link).

Auto-negotiation automatically configures duplex and speed. It is also possible to turn off auto-negotiation and force both speed and duplex.

The duplex mismatch detect module 120 and event log message generator 125 may be integrated into a single module which can be called as a duplex mismatch finder.

The fault finders 115A and 115B, duplex mismatch detect modules 120A and 120B, and event log message generators module 125A and 125B are typically implemented in software and are stored in a memory (e.g., memories 132A and 132B) in the nodes 105. The fault finders 115A and 115B, duplex mismatch detect module 120A and 120B, and event log message generator modules 125A and 125B are typically programmed in a suitable programming language, such as, for example, the C programming language, and are created by use of known code programming techniques.

The processors 130A and 130B (generally, processor 130) execute the fault finders 115A and 115B (generally, fault finder 115), duplex mismatch detect module 120A and 120B (generally, module 120), and event log message generator module 125A and 125B (generally, module 125), respectively, and also execute other software or firmware in a node 105.

The fault finder 115 is a module that detects for fault conditions in a network. A fault condition can include, for example, a loop configuration in the network. A fault condition can also include over threshold late collisions and over threshold cyclic redundancy check errors, as described below. An embodiment of the fault finder 115 is implemented in, for example, the PROCURVE 5304 and 5308 switches and other switches which are commercially available from HEWLETT-PACKARD COMPANY.

The fault finder 115A on the first node 105A may be configured to check the error counters 145A and 150A, while fault finder 115B on the second node 105B may be configured check the error counters 145B and 150B.

The fault finder 115A on the first node 105A may be configured to generate an event log message 155A. The event log message 155A may be based upon the values in the late collision counter 145A and CRC error counter 150A exceeding threshold values that are either default or are set by the user. The event log message 155A may also depend upon whether the port is set to forced mode or auto-negotiation mode, as discussed below. When the collision counter 145A exceeds a threshold value (a user-settable boundary), the fault finder 115A sets a flag 155A. When the CRC error counter 150A exceeds a threshold value (a user-settable boundary), the fault finder 115A sets a flag 160A. The flags 155A and 160A are typically values that are set in a memory (e.g., memory 132A) in the node 105A.

Similarly, the fault finder 115B on the second node 105B will generate an event log message 155B. The event log message 155B may be based upon the values in the late collision counter 145B and CRC error counter 150B exceeding threshold values that are set by the user. The event log message 155B may also depend upon whether the port is set to forced mode or auto-negotiation mode, as discussed below. When the collision counter 145B exceeds a threshold value (a user-settable boundary), the fault finder 115B sets a flag 155B. When the CRC error counter 150B exceeds a threshold value (a user-settable boundary), the fault finder 115B sets a flag 160B. The flags 155B and 160B are typically values that are set in a memory (e.g., memory 132B) in the node 105B.

Various parameters are then checked by the duplex mismatch detect modules 120 and event log message generator 125 (i.e., parameters are checked by the duplex mismatched finder) in order to detect a duplex mismatch, as discussed further below in relation to FIG. 2, in accordance with an embodiment of the invention.

The event log message generator 125 may also be configured to provide an indication to the duplex mismatch fixer 182 when a duplex mismatch has been found. A duplex mismatch fixer (182A and 182B) is shown in each of the nodes (105A and 105B) in the embodiment shown in FIG. 1. In other embodiments, a duplex mismatch fixer 182 may be in one, but not the other, node. FIG. 1 also shows flags (184A and 184B) which are utilized by the duplex mismatch fixers (182A and 182B). The automated correction (fixing) of duplex mismatch errors is discussed further below in relation to FIG. 3.

Various standard components and/or software in the nodes 105A and 105B (and in the network 100) have been omitted in FIG. 1 for purposes of clarity and for purposes of focusing on the functionalities of embodiments of the invention.

It should be appreciated that, in alternative embodiments, the network system 100 may include components and products other than those discussed above. Moreover, the network system 100 may be implemented on different hardware. Those skilled in the art will recognize that other alternative hardware and software environments may be used without departing from the scope of embodiments of the invention. As such, the exemplary environment in FIG. 1 is not intended to limit embodiments of the invention.

Figure 2:
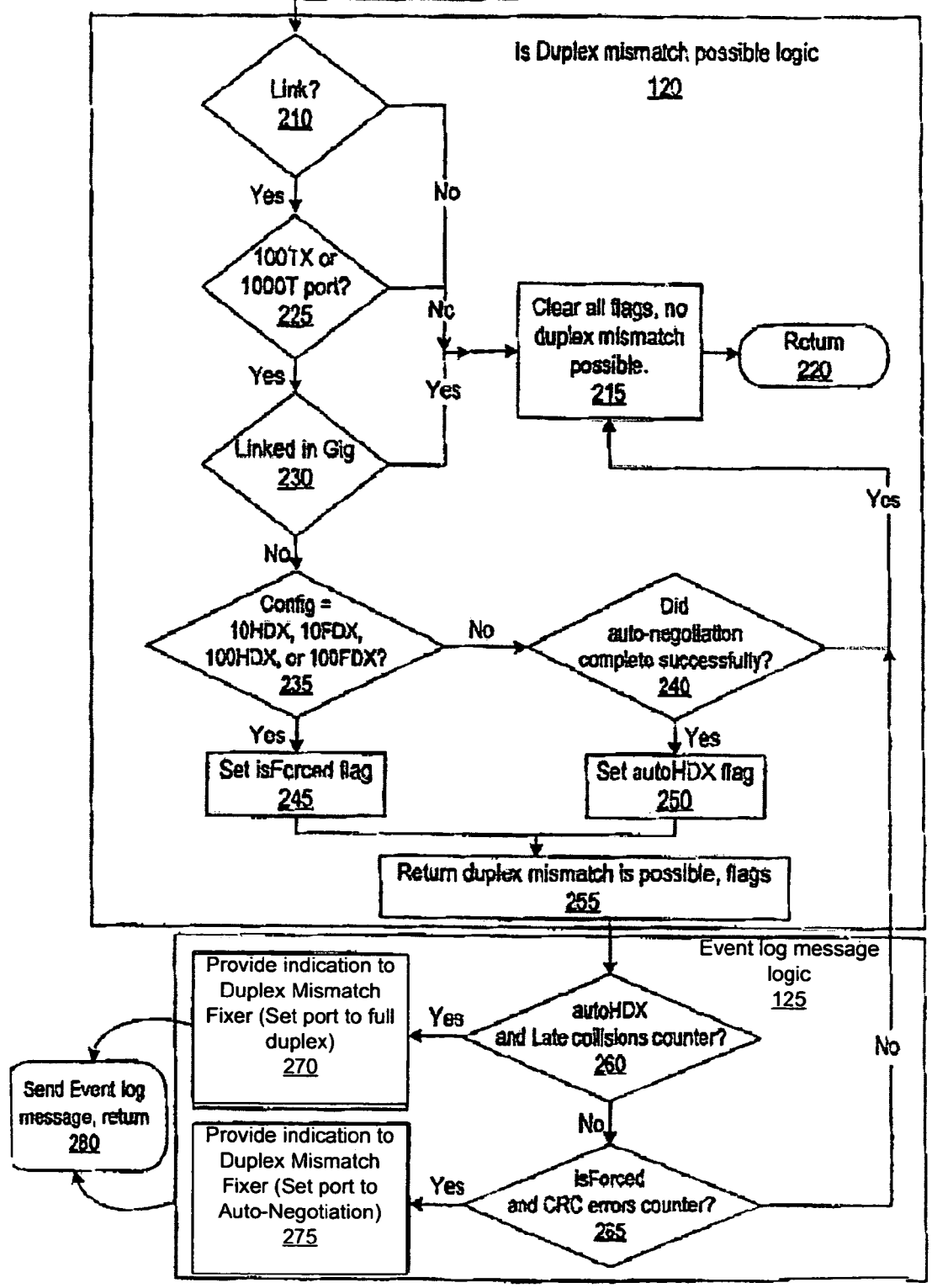
FIG. 2 is a block diagram of a method of automated detection of a duplex mismatch in accordance with an embodiment of the invention.

FIG. 2 is a block diagram of a method 200 of automated detection of a duplex mismatch in accordance with an embodiment of the invention. In block 205, the late collision error flag 155 is set if the late collision error counter 145 exceeds a user settable threshold value, or the CRC error flag 160 is set if the CRC error counter 150 exceeds a user settable threshold value. In accordance with one embodiment, the user settable threshold values the late collision errors and CRC errors may be set to a same value. Alternatively, the threshold values may be set to different values. The threshold value for the late collision error counter 145 and for the CRC error counter 150 is typically measured in errors per second and may be set to any suitable value depending on, for example, implementation. Block 205 may be performed by the fault finder 115 checking the counters 145 and 150 and setting the flags 155 and/or 160 depending on whether or not the threshold is exceeded.

Late collision error is defined in the Ethernet specification. Late collisions occur when there is a late occurrence of a collision on the link. In an Ethernet network, a collision is the result of two devices on the same Ethernet network attempting to transmit data at exactly the same time. The network detects the "collision" of the two transmitted packets and discards them both. Repeated Late collisions are a very good indication that one node is trying to transmit data while the opposite node in the link is transmitting data, and therefore, a duplex mismatch may be present.

CRC is a method of checking for errors in data that has been transmitted on a communications link. A sending device applies a 16-bit or 32-bit polynomial to a block of data that is to be transmitted and appends the resulting cyclic redundancy code (CRC) to the block. The receiving end applies the same polynomial to the data and compares its result with the result appended by the sender. If the devices agree, the data has been received successfully. If not, the sender can be notified to resend the block of data.

If there is a duplex mismatch, then a node 115 will see repeated late collision errors or a CRC errors, depending on whether the node 115 is set for full-duplex or half-duplex.

After the late collision error flag 155 is set (i.e., the late collisions exceeded a user settable threshold value) or CRC flag 160 is set (i.e., the CRC errors exceeded a user settable threshold value), then in block 210, a check if a node port 140 is connected to a link 110. If, in block 210, the node port 140 is not connected to a link 110, then, in block 215, the flags 155 or 160 are cleared and a duplex mismatch is regarded as not present or as not possible. In block 220, the method 200 returns to block 205 where the fault finder 115 will check the late collision error counter 155 and the CRC error counter 160 and set the flags 155 or 160 if the collision error counter 155 or the CRC error counter 160, respectively, exceeds a user settable threshold value.

If, in block 210, the node port 140 is connected to a link 110, then, in block 225, the port 140 is checked if it is a 100TX port or 1000T port (i.e., the port 140 is checked if it is a copper port, since a duplex mismatch generally only occur between copper ports). If, in block 225, the node port 140 is not a copper port, then blocks 215 and 220 are repeated as discussed above, and a duplex mismatch is regarded as not present or as not possible. Therefore, fiber ports are not checked for duplex mismatches.

If, in block 225, the node port 140 is connected to a copper port, then, in block 230, a check is performed to determine if the port 140 is connected to a gigabit link (1000T link) (i.e., the port is up in gigabit mode). A duplex mismatch will typically not occur in gigabit mode because the gigabit Ethernet standard typically only supports full-duplex for connected device (although the gigabit Ethernet standard has the half-duplex mode, it does not use the half-duplex mode). If, in block 230, the port 140 is connected to a gigabit link, then blocks 215 and 220 are repeated as discussed above, and a duplex mismatch is regarded as not present or as not possible.

If, in block 230, the port 140 is not connected to a gigabit link, then, in block 235, a check is performed on the configuration to determine if the port is set in forced mode. The forced mode can be 10HDX (half-duplex), 10FDX (full-duplex), 100HDX, or 100FDX.

If forced mode is set in block 235, then, in block 245, the isForced flag (generally flag 170, and specifically flags 170A or 170B in FIG. 1) may be set by the duplex mismatch detect module 120.

If forced mode is not set in block 235, then, in block 240, a check is performed to determine if auto-negotiation was completed successfully. The duplex mismatch detect module 120 may check the PHY 135 to determine if auto-negotiation has failed. The auto-negotiation process is disclosed in the standard IEEE 802.3 clause 36, which is hereby fully incorporated herein by reference.

If auto-negotiation is not completed successfully in block 240, then blocks 215 and 220 are repeated as discussed above, and a duplex mismatch is regarded as not present or as not possible.

If auto-negotiation is completed successfully in block 240, then, in block 250, the autoHDX flag (generally flag 175, and specifically flags 175A or 175B in FIG. 1) is set by the duplex mismatch detect module 120, to indicate that the port 140 is in auto-negotiation mode and in half duplex. Note that it may be possible for a port be in auto-negotiation mode and in full duplex. However, in the embodiments described herein, the flag is looking for a possible error condition which can only occur when the port comes up in half duplex while in auto-negotiation mode.

The flags 170 and 175 are values that may be set in memory in a node 105.

In block 255 (with the "return duplex mismatch is possible flags"), at this point it is known that a duplex mismatch is possible, so a message will be sent which includes the error condition denoted by these flags.

The duplex mismatch detect module 120 may be configured to perform the above-mentioned actions in blocks 210 through 255.

The following blocks then ensure that the correct counter has matched the perceived side of the duplex mismatch. When there is a duplex mismatch, one node's fault finder 115 will generally detect the late collisions, while the opposite node's fault finder 115 will generally detect the CRC errors.

In block 260, if the autoHDX flag 175 is set and the late collision counter 145 has exceeded the user-settable threshold, then an indication 270 may be provided to the duplex mismatch fixer 182 that a duplex mismatch was found. In this case, the autoHDX flag 175 indicates that the port 140 is currently in auto-negotiation mode and in half duplex. Hence, the indication 270 provided to the duplex mismatch fixer 182 may further indicate or recommend setting the port to full duplex mode. The indication 270 may be made, for example, via flags accessible by the fixer module 182, or may be made by sending a message to the fixer module 182.

In block 280, the information that is provided in block 270 may also be provided to the user by sending an event log message 155, and the method 200 may then return to block 205 where the fault finder 115 will check the late collision error counter 155 and the CRC error counter 160 and set the flags 155 or 160 if the collision error counter 155 or the CRC error counter 160, respectively, exceeds a user sellable threshold value.

The event log message generator 125 (see FIG. 1) may be configured to inform the fault finder 115 to generate an event log message 155 with the information in block 270.

On the other hand, in block 260, if the autoHDX flag 175 is not set or if the late collisions counter 145 did not exceed the user settable threshold, then the method 200 proceeds to block 265.

In block 265, if the isForced flag 170 is set and the CRC error counter 150 has exceeded the user-settable threshold, then, in block 275, an indication 275 may be provided to the duplex mismatch fixer 182 that a duplex mismatch was found. The isForced flag 170 indicates that the port 140 is currently in forced mode. Hence, the indication 275 provided to the duplex mismatch fixer 182 may further indicate or recommend setting the port to auto-negotiation mode. The indication 275 may be made, for example, via flags accessible by the fixer module 182, or may be made by sending a message to the fixer module 182.

In block 280, the information that is provided to the duplex mismatch fixer 182 in block 275 may also be provided to the user by sending an event log message 155, and the method 200 then returns to block 205 where the fault finder 115 will check the late collision error counter 155 and the CRC error counter 160 and set the flags 155 or 160 if the collision error counter 155 or the CRC error counter 160, respectively, exceeds a user settable threshold value.

The event log message generator 125 (FIG. 1) may be configured to inform the fault finder 115 to generate an event log message 155 with the information in block 275.

On the other hand, in block 265, if the isForced flag 170 is not set or if the CRC error counter 150 did not exceed the user settable threshold, then blocks 215 and 220 are repeated as discussed above, and a duplex mismatch is regarded as not present or as not possible.

The event log message generator 125 may be configured to perform the above-mentioned actions in blocks 260 through 275.

Thus, block 270 informs the fixer module 182 of a duplex mismatch where setting the port to full duplex is a likely solution, and block 275 informs the fixer module 182 of a duplex mismatch where setting the port to auto-negotiation is a likely solution. In addition, block 280 may inform the user of the duplex mismatch information.

Figure 3:
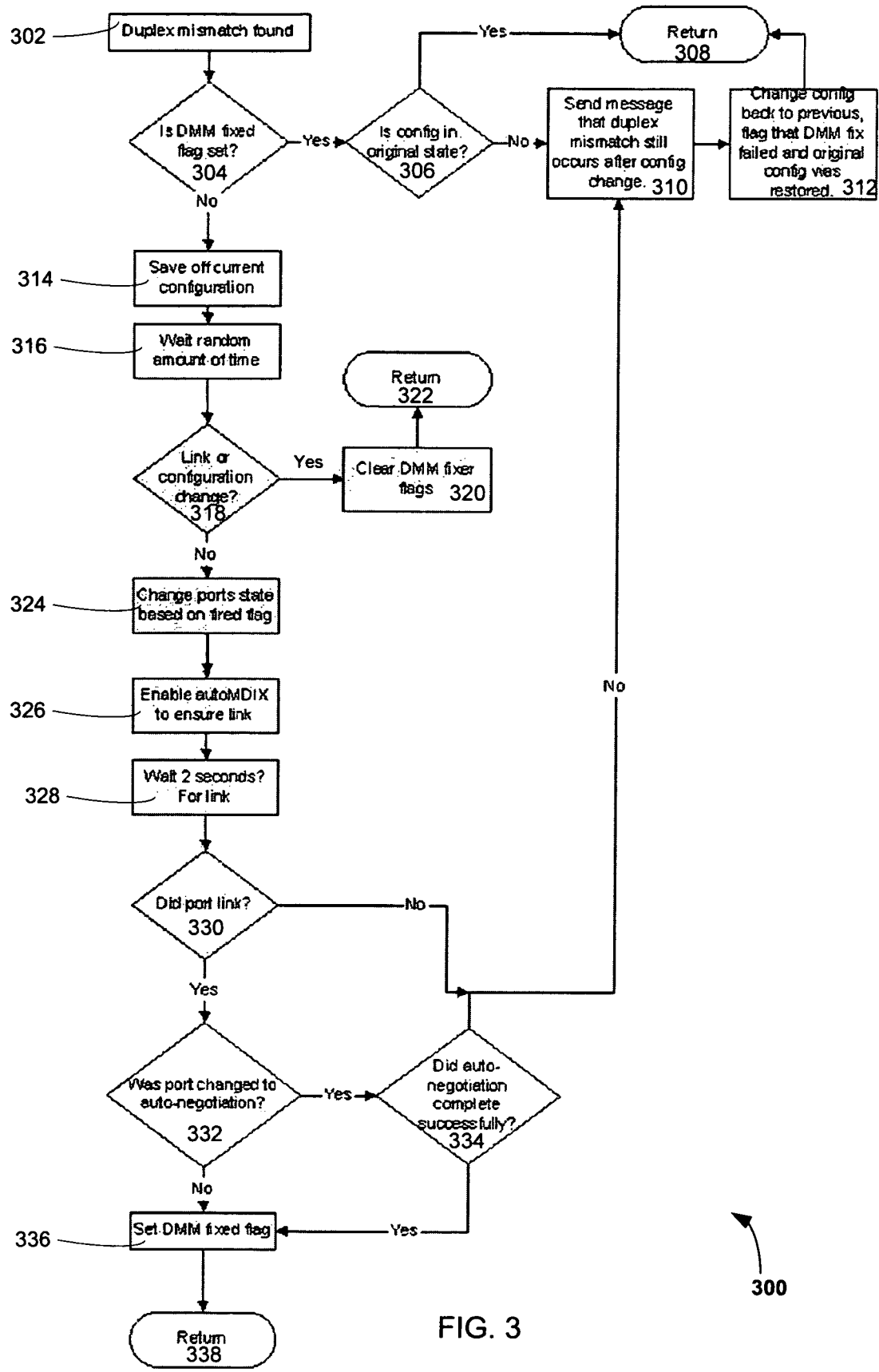
FIG. 3 is a block diagram of a method of automated correction of a duplex mismatch in accordance with an embodiment of the invention.

FIG. 3 is a block diagram of a method 300 of automated correction (automated fixing) of a duplex mismatch in accordance with an embodiment of the invention. Once a duplex mismatch is found 302, the subsequent steps of the method 300 may be performed, for example, by a duplex mismatch finder module 182 in the node 105. In one embodiment, the duplex mismatch may be found 302 using the method 200 discussed above in relation to FIG. 2.

In accordance with an embodiment of the invention, the node 105 may also be configured with a manual mode Auto-MDIX. Auto-MDIX automatically configures node interface devices having Media Dependent Interfaces (MDIs) to avoid lock step operations. Auto-MDIX is described in detail, for example, in U.S. Pat. Nos. 6,175,865 and 6,460,078. The disclosures of the aforementioned patents are hereby incorporated by reference.

Once the duplex mismatch is found 302, a determination 304 is made as to whether a duplex mismatch (DMM) fixed flag for this port is set. In other words, whether this mismatch may have already been corrected.

If it is determined 304 that the DMM fixed flag is already set for the mismatched port, then a further determination 306 is made as to whether the configuration of the mismatched port is in its original (unchanged) state. If the configuration is its original state, then the method 300 may return 308 to a higher-level control routine. On the other hand, if the configuration of the mismatched port has been changed from its original state, then a message may be generated and sent 310 to a user that the duplex mismatch still occurs after a configuration change. In other words, the configuration change did not solve the duplex mismatch problem for this port. As such, in block 312, the configuration may be changed back to its previous (original) state, and a flag may be set to indicate that the DMM fix failed and that the original configuration was restored for this port. Thereafter, the method 300 may return 308 to a higher-level control routine.

If it is determined 304 that the DMM fixed flag for the mismatched port not set, then the mismatched port's current (original) configuration is saved 314 such that it may be restored later if desired. After saving 314 off the port's configuration, the method 300 may proceed as follows.

First, a random or pseudo-random amount of time may be waited 316 while the port configuration of the link partner (i.e. the port at the other end of the mismatched port's link) is watched. This random wait period is for the situation where the link partner also has the DMM fixer feature enabled. In such a situation, the random wait period makes it highly unlikely that both nodes change their port configuration at the same time. This "random" time shall be longer if the node is configured for auto-negotiation, and shorter if configured in Forced full-duplex. After the random wait period, the method 300 determines 318 whether the link partner's configuration has changed during the random wait period.

If the link partner's configuration has changed, then this means that the DMM fixer feature of the link partner has already made a change to fix the mismatch. As such, the DMM fixer flags 184 may be cleared 320, and the method 300 may return 322 to a higher-level control routine.

On the other hand, if the link partner's configuration has not changed, then the method 300 may proceed to fix or attempt to fix the mismatch at this end of the link. The configuration state of the mismatched port may be changed 324 based on the characteristics of the mismatch at this end of the link.

In one case, the duplex mismatch may be characterized by the autoHDX flag 175 and the late collisions threshold exceeded flag 155 being both set. In this case, the configuration for the mismatched port may be changed 324 to a full duplex state. In another case, the duplex mismatch may be characterized by the isForced flag 170 and the CRC errors threshold exceeded flag 160 being both set. In this case, the configuration for the mismatched port may be changed 324 to an auto-negotiation state.

After changing 324 the port state, the AutoMDIX feature may be enabled 326. Auto-MDIX automatically configures node interface devices having Media Dependent Interfaces (MDIs) to avoid lock step operations. Enablement of Auto-MDIX advantageously allows the method 300 to assure the link. The method 300 may be configured to wait 328 a period of time for the link. For example, the period of time waited may be two seconds. After waiting 328 for the link, a determination 330 may be made as to whether the link was made by the port.

If it is determined 330 that the link was not made, then a message may be generated and sent 310 to a user that the duplex mismatch still occurs after a configuration change. Furthermore, in block 312, the configuration may be changed back to its previous (original) state, and a flag may be set to indicate that the DMM fix failed and that the original configuration was restored for this port. Thereafter, the method 300 may return 308 to a higher-level control routine.

On the other hand, if it is determined 330 that the link was made, then a further determination 332 is made as to whether the port was changed to the auto-negotiation state.

If it is determined 332 that the port was not changed to auto-negotiation (i.e. if the port was changed to full duplex), then a DMM fixed flag may be set 336 so as to indicate the successful correction of the duplex mismatch error, and the method 300 may return 338 to a higher-level control routine.

On the other hand, if it is determined 332 that the port was changed to auto-negotiation, then the method 300 may perform further steps to verify that the port successfully completed the negotiation. Hence, a further determination 334 is made as to whether the auto-negotiation completed successfully. If it is determined 334 that the auto-negotiation did not complete successfully, then a message may be generated and sent 310 to a user that the duplex mismatch still occurs after a configuration change. Furthermore, in block 312, the configuration may be changed back to its previous (original) state, and a flag may be set to indicate that the DMM fix failed and that the original configuration was restored for this port. Thereafter, the method 300 may return 308 to a higher-level control routine. On the other hand, if it is determined 334 that the auto-negotiation did complete successfully, then the DMM fixed flag may be set 336 so as to indicate the successful correction of the duplex mismatch error, and the method 300 may return 338 to a higher-level control routine.

In the description herein, numerous specific details are provided, such as examples of components and/or methods, to provide a thorough understanding of embodiments of the invention. One skilled in the relevant art will recognize, however, that an embodiment of the invention may be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for correcting in an automated manner duplex mismatches between a first port of a first network device and a second port of a second network device the method performed by one or more processors of the first network device executing computer-executable code, the method comprising:
    determining whether the first port is a copper port;
    in response to determining that the first port is not a copper port, indicating that a duplex mismatch between the first port and the second port is not possible;
    in response to determining that the first port is a copper port,
        determining whether the first port is operating in a gigabit mode;
        in response to determining that the first port is operating in the gigabit mode, indicating that a duplex mismatch between the first port and the second port is not possible;
        in response to determining that the first port is not operating in the gigabit mode,
            detecting a duplex mismatch at the first port of the first network device;
            in response to detecting the duplex mismatch,
                determining characteristics of the duplex mismatch, where the characteristics comprise one of:
                    a first indication that cyclic redundancy check errors have exceeded a threshold level at the first port, corresponding to late collisions being detected at the second port,
                    a second indication that the late collisions have occurred at the first port, corresponding to the cyclic redundancy check errors having exceeded the threshold level at the second port;
                waiting for an effectively random period of time, where the effectively random period of time is a first period of time where the first port is currently configured for auto-negotiation, where the effectively random period of time is a second period of time where the first port is currently configured for forced full duplex, the second period of time being longer than the first period of time, and
                after waiting for the effectively random period of time, modifying a configuration of the first port of the first network device based upon said characteristics.

2. The method of claim 1, wherein the modifying the configuration of the first port based upon said characteristics comprises changing the configuration of the first port to a full duplex mode.

3. The method of claim 1, wherein modifying the configuration of the first port based upon said characteristics comprises changing the configuration of the first port to an auto-negotiation mode.

4. The method of claim 1, further comprising:
    waiting for a link to be made by the first port with the second port after modifying the configuration of the first port.

5. The method of claim 4, further comprising:
    if the first port is unsuccessful in making the link with the second port, then indicating that the duplex mismatch continues to occur after modifying the configuration of the first port.

6. The method of claim 4, further comprising:
    if the first port successfully makes the link, then setting a flag indicating that the duplex mismatch has been fixed.

7. The method of claim 6, further comprising:
    if the duplex mismatch continues to be detected after setting the flag, then indicating that the duplex mismatch continues to occur after modifying the configuration of the first port.

8. The method of claim 1, further comprising:
    saving an unmodified state of the configuration of the first port; and
    returning the configuration to the unmodified state if the duplex mismatch continues to occur after modifying the configuration of the first port.

9. An apparatus for automated correction of duplex mismatches, comprising:
    hardware;
    a duplex mismatch detector configured to:
    determine whether a port of the apparatus is a copper port;
    in response to determining that the first port is not a copper port, indicate that a duplex mismatch is not possible;
    in response to determining that the first port is a copper port, determine whether the first port is operating in a gigabit mode;
    in response to determining that the first port is operating in the gigabit mode, indicate that a duplex mismatch is not possible;
    in response to determining that the first port is not operating in the gigabit mode,
    detect a duplex mismatch at the port;
    determine characteristics of the duplex mismatch, where the characteristics comprise one of:
    a first indication that cyclic redundancy check errors have exceeded a threshold level at the port, corresponding to late collisions being detected at a second port of a different apparatus to which the port of the apparatus is communicatively coupled;
    a second indication that the late collisions have occurred at the port, corresponding to the cyclic redundancy check errors having exceeded the threshold level at the second port; and
    an automated duplex mismatch fixer to:
    modify a configuration of the port based upon said characteristics;
    prior to modifying the configuration of the port, wait for an effectively random period of time,
    where the effectively random period of time is a first period of time where the first port is currently configured for auto-negotiation,
    where the effectively random period of time is a second period of time where the first port is currently configured for forced full duplex, the second period of time being longer than the first period of time,
    wherein one or more of the duplex mismatch detector and the automated duplex mismatch fixer are implemented at least by the hardware.

10. The apparatus of claim 9, further comprising:
a fault finder configured to count the late collisions and the cyclic redundancy check errors for detecting and characterizing the duplex mismatch.

11. The apparatus of claim 10, further comprising:
a processor configured to execute processor-executable code including the fault finder, the duplex mismatch detector, and the automated duplex mismatch fixer.

12. The apparatus of claim 9, wherein the automated duplex mismatch fixer is further configured to change the configuration of the port to a full duplex mode if the port is in an auto-negotiation mode.

13. The apparatus of claim 9, wherein the automated duplex mismatch fixer is further configured to change the configuration of the port to an auto-negotiation mode if the port is in a forced mode.

14. The apparatus of claim 9, wherein the automated duplex mismatch fixer is further configured to wait for a link to be made by the mismatched port after modification of the configuration of the port and to either indicate that the duplex mismatch continues to occur after the modification of the configuration in a first case where the port is unsuccessful in making the link, or set a flag indicating that the duplex mismatch has been fixed in a second case where the port successfully makes the link.

15. The apparatus of claim 9, wherein the automated duplex mismatch fixer is further configured to save an unmodified state of the configuration of the port, and to return the configuration to the unmodified state if the duplex mismatch continues to occur after the modification of the configuration.

* * * * *